United States Patent [19]
Bell, Jr.

[11] Patent Number: 6,006,344
[45] Date of Patent: Dec. 21, 1999

[54] KEYBOARD CONTROLLED DIAGNOSTIC SYSTEM

[75] Inventor: Joseph W. Bell, Jr., Austin, Tex.

[73] Assignee: Dell USA, L.P., A Texas Limited Partnership, Round Rock, Tex.

[21] Appl. No.: 08/784,573

[22] Filed: Jan. 21, 1997

[51] Int. Cl.[6] .................................................. G06F 11/00
[52] U.S. Cl. ............................ 714/37; 714/27; 714/732; 710/12
[58] Field of Search ......................... 395/183.13, 183.01, 395/183.06, 183.22; 364/488, 489, 491; 714/37, 25, 27, 30, 46, 43, 56; 710/13, 36, 52, 65

[56] References Cited

U.S. PATENT DOCUMENTS

| | | |
|---|---|---|
| 4,334,307 | 6/1982 | Bourgeois et al. ..................... 371/16.5 |
| 4,729,124 | 3/1988 | Hansel et al. ....................... 395/183.07 |
| 5,193,174 | 3/1993 | Bealkowski et al. .................... 395/500 |
| 5,245,615 | 9/1993 | Treu ....................................... 371/16.5 |
| 5,371,861 | 12/1994 | Keener et al. ........................... 395/309 |
| 5,398,333 | 3/1995 | Schieve et al. ..................... 395/183.12 |
| 5,463,766 | 10/1995 | Schieve et al. ......................... 395/652 |
| 5,530,847 | 6/1996 | Schieve et al. ..................... 395/183.14 |
| 5,550,991 | 8/1996 | Keener et al. ........................... 395/309 |
| 5,630,048 | 5/1997 | La Joie et al. ............................ 714/25 |
| 5,657,445 | 8/1997 | Pearce .................................... 395/186 |

*Primary Examiner*—Dieu-Minh T. Le
*Attorney, Agent, or Firm*—Skjerven, Morrill, MacPherson, Franklin & Friel, L.L.P.; Stephen A. Terrile

[57] ABSTRACT

A personal computer system is discloses which includes a diagnostic system which uses an input/output controller to perform diagnostic functions. Such a system advantageously allows diagnostic functions to be performed on the computer system including the system processor of the computer system. The diagnostic program may be stored within non-volatile memory which is coupled to the I/O controller, thus allowing diagnostic functions to be performed without the need for the computer system memory of the computer system.

15 Claims, 4 Drawing Sheets

KEYBOARD CONTROLLED DIAGNOSTIC SYSTEM

BACKGROUND

The present invention relates to computer systems, and more particularly to diagnostic systems for use with computer systems such as personal computer systems.

Personal computer systems in general and IBM compatible personal computer systems in particular have attained widespread use for providing computer power to many segments of today's modern society. A personal computer system can usually be defined as a desk top, floor standing, or portable microcomputer that includes a system unit having a system processor and associated volatile and nonvolatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user and are inexpensively priced for purchase by individuals or small businesses.

It is known to provide computer systems with diagnostic systems to increase the reliability, availability and serviceability of the computer system. In general, diagnostic systems provide a diagnostic function of detecting and analyzing errors or faults that occur in either or both the hardware and software portions of the computer system. A diagnostic system typically detects errors as they occur and logs such errors for later analysis by a diagnostic program. Often in personal computer systems, the diagnostic system provides a relatively narrow set of functions which are limited to displaying to the user a cryptic error code as errors are detected during a power on self test, or while the system is operating normally, or as a result of running a test or diagnostic program. The user is then left with the problem of deciding what the code or message means and what to do about it.

One challenge with present diagnostic systems is that they depend on a large portion of the system being operational because the diagnostic program of the diagnostic system is generally read from a diskette or hard disk drive and executed on the system processor using the system memory. After running the diagnostic program, the results are then either presented on the system's display, stored on a disk using the system's diskette drive or printed using the system's printer.

Larger computer systems often provide diagnostic subsystems to perform the diagnostic function. These subsystems typically include what is effectively an auxiliary computer system which is expressly designed to perform the diagnostic function. Often these larger computer systems provide a remote interface to the diagnostic subsystem so that the diagnostic function may be operated from a remote site and any problems reported back to the remote site. However, personal computer systems, by their very definition, are small systems which for reasons of cost and complexity cannot support these types of diagnostic subsystems.

Personal computer systems have implemented various procedures to address shortcomings with present diagnostic systems. For example, a diagnostic program which resides within the system's non-volatile memory is provided to address the problem of requiring a working diskette or hard disk drive. Also for example, remote interface capability has been provided to address the problem of requiring a functioning display device or printer. However, with both of these options, the diagnostic program must still execute using the system processor and the system memory.

SUMMARY

It has been discovered that providing a personal computer system having a diagnostic system that uses an input/output controller to perform diagnostic functions advantageously allows the diagnostic functions to be performed on the computer system, including performing diagnostic functions on the system processor of the computer system. It has also been discovered that the diagnostic program may be stored within nonvolatile memory that is coupled to an I/O controller, thus allowing diagnostic functions to be performed without the need for the computer system's system memory.

DETAILED DESCRIPTION

The following sets forth a detailed description of the best contemplated mode, which is intended to be illustrative of the invention and should not be taken to be limiting.

Figure 1:
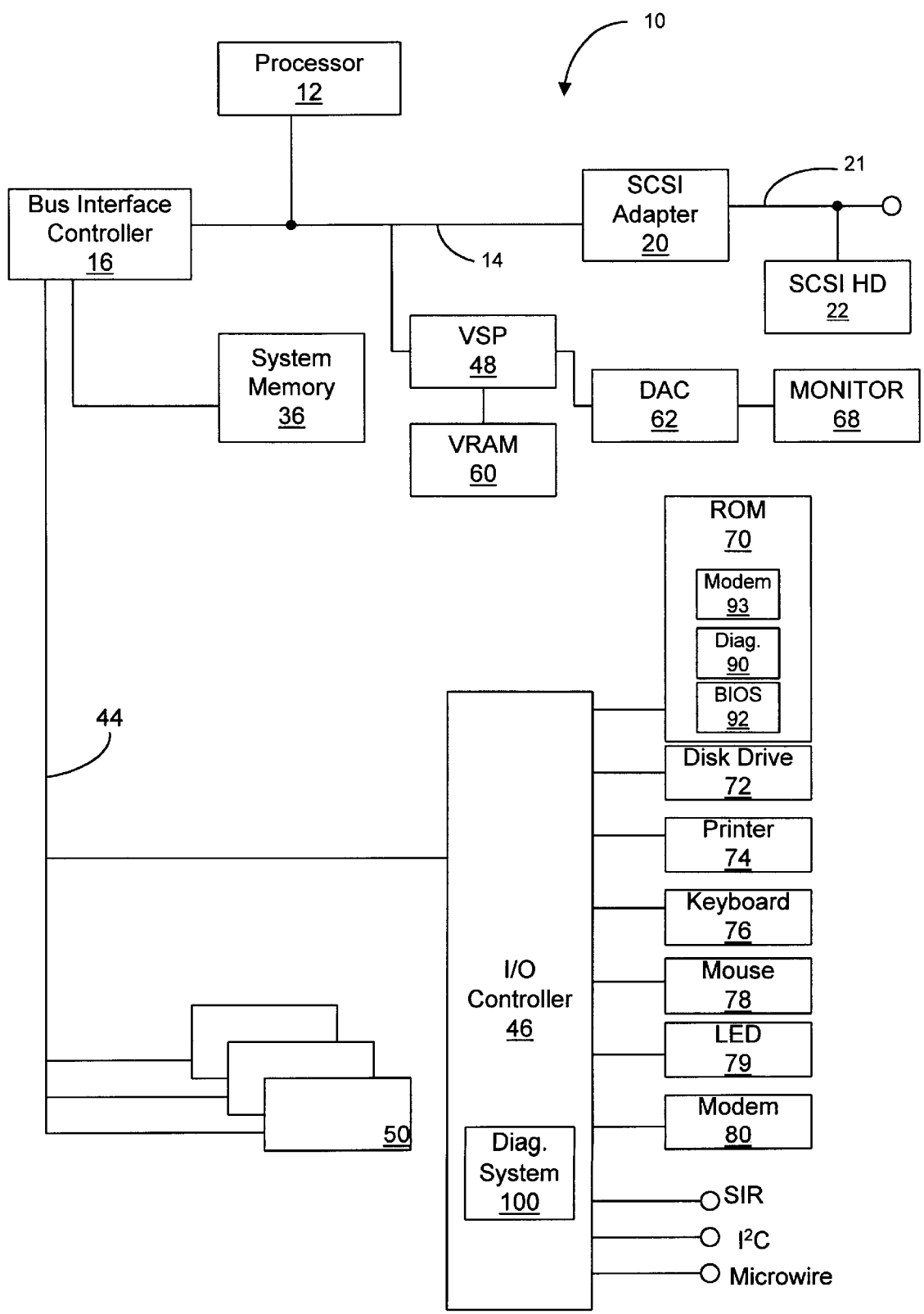
FIG. 1 is a schematic block diagram of a computer system which includes a diagnostic system in accordance with the present invention.

Referring to FIG. 1, an illustrative computer system 10 is shown. Computer system 10, for example, includes system processor 12, coupled to local bus 14 which, in turn, may be coupled to, for example, bus interface controller 16, small computer system interface (SCSI) adapter 20 and video signal processor (VSP) 48. Processor 12 is preferably a microprocessor from the family of x86 processors, such as a 486 or PENTIUM™ microprocessor. Local bus 14 includes conventional data, address and control lines conforming to the architecture of the processor. SCSI adapter 20 couples local bus 14 to SCSI bus 21 to which SCSI devices, such as a SCSI hard drive 22, may be coupled.

Bus interface controller 16 can perform at least two primary functions. The first function includes a memory controller function for accessing main system memory 36. Main system memory 36 includes, for example, a dynamic random access memory (RAM) which includes one or more single, in-line memory modules (SIMMS) and stores programs and data for execution by system processor 12.

The second function that bus interface controller 16 performs is as an interface between bus 14 and input/output (I/O) bus 44. I/O bus 44 may conform to the industry standard architecture (ISA) standard, which is also sometimes referred to as the AT bus standard. Bus 44 is further coupled to I/O controller 46 and a plurality of I/O slots 50, into which a variety of I/O or expansion cards (not shown) may be inserted.

Video signal processor 48 is further coupled to video RAM (VRAM) 60 and to digital to analog converter (DAC)

62. Digital to analog converter 66 is coupled to monitor 68, which is a conventional computer display device conforming to, e.g., the super video graphics array (SVGA) standard.

I/O controller 46 is coupled to nonvolatile memory 70 which is, e.g., a read only memory (ROM) 70. In the preferred embodiment, nonvolatile memory 70 is an updatable device, such as a flash ROM device. I/O controller 46 is also coupled to and controls the operation of I/O devices such as disk drive 72, printer 74, keyboard 76, mouse 78 and light emitting diode (LED) 79. I/O controller 46 also includes a modem port to which a modem 80 may be optionally connected. Nonvolatile memory 70 stores diagnostic program 90 as well as basic input output system (BIOS) 92. Alternately, nonvolatile memory 70 may be coupled between bus interface controller 16 and I/O controller 46.

Diagnostic program 90 includes the instructions and data for performing the primary diagnostic function of computer system 10 when system 10 is first powered on or is reset, as well as any other time that a diagnostic function is desired. BIOS 92 is a microcode software interface between an operating system or application programs and the hardware of system 10. The operating system and application programs access BIOS 92 rather than directly manipulating I/O ports and control words of the specific hardware. BIOS 92 is accessed through an interface of software interrupts and contains a plurality of entry points corresponding to the different interrupts. In operation, BIOS 92 is loaded from nonvolatile memory 70 to system memory 36 and is executed from system memory 36.

I/O controller 46 also includes diagnostic system 100 which functions with diagnostic program 90 to perform the primary test of computer system 10 when system 10 is first powered on or is reset as well as other times that diagnostic tests might be appropriate. Diagnostic system 100 controls the operation of LED 79, which, when blinking, indicates that diagnostic system 100 is operating.

Figure 2:
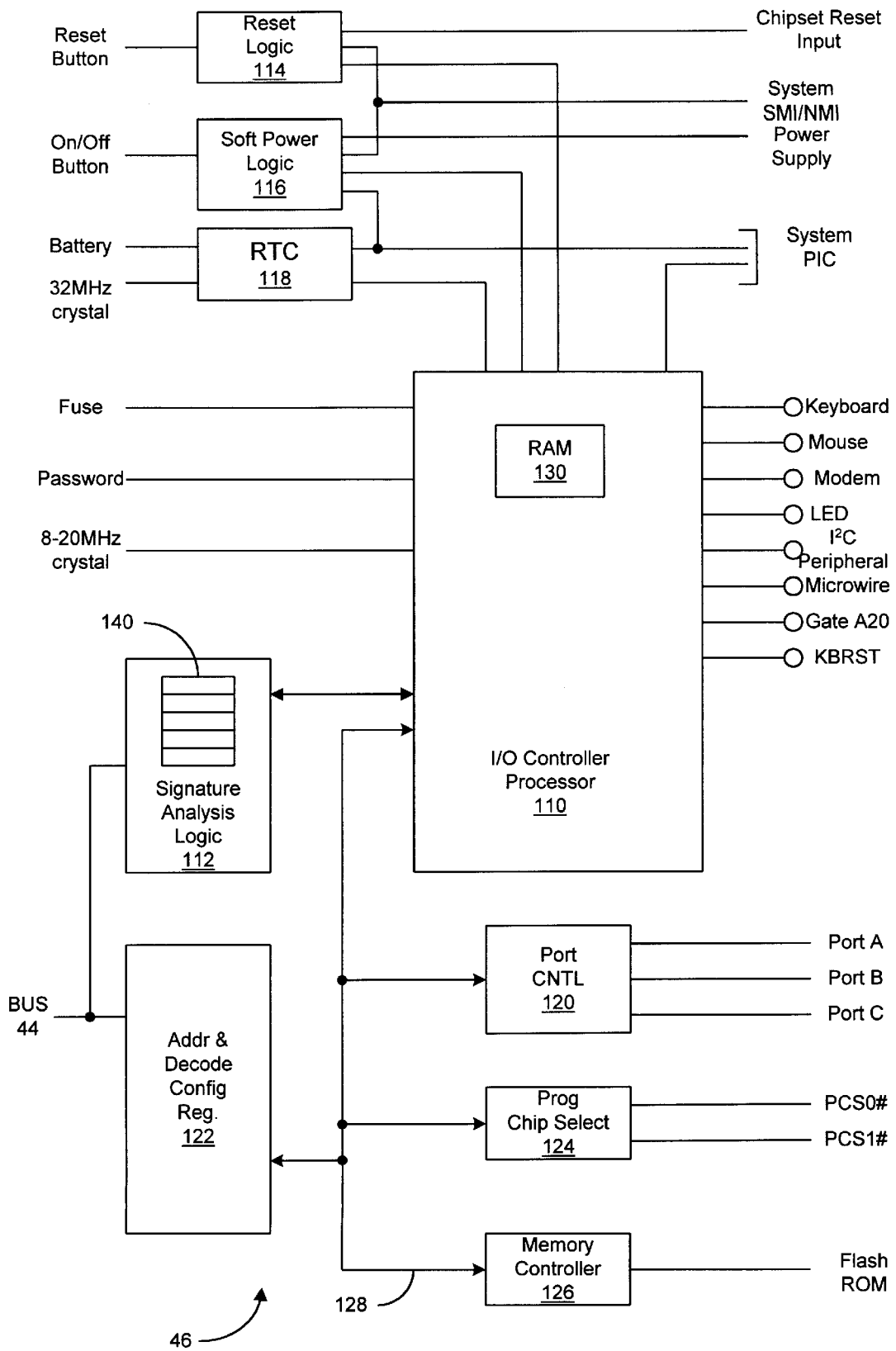
FIG. 2 is a schematic block diagram of an input/output controller in accordance with the present invention.

Referring to FIG. 2, I/O controller 46 is shown in more detail. More specifically, I/O controller 46 includes I/O controller processor 110, signature analysis logic 112, reset logic 114, soft power logic 116, real time clock (RTC) 118, port control logic 120, address decode and configuration registers 122, programmable chip select logic 124 and flash memory controller logic 126. I/O controller 46 also includes internal I/O controller bus 128 which couples I/O controller processor 110, port logic 120, address decode and configuration registers 122, programmable chip select logic 124 and flash memory controller logic 126. Additionally, reset logic 114, soft power logic 116 and real time clock 118 are individually coupled to I/O controller processor 110.

I/O controller processor 110 in conjunction with signature analysis logic 112 provide a diagnostic system. When performing particular diagnostic functions, as described in more detail below, the diagnostic system may also include reset logic 114, soft power logic 116 and RTC 118. Signature analysis logic 112 and address and decode configuration registers 122 are dual ported such that they may be accessed by the I/O controller processor 110 or by system processor 12 (see, e.g., FIG. 1). System processor 12 accesses signature analysis logic 112 and address and decode configuration registers 122 via bus 44.

I/O controller processor 110 functions as a universal serial bit stream processor. I/O controller processor 110 may be software compatible with a microcontroller available from Intel Corporation under the trade designation 8052. I/O controller processor 110 also includes an 8052 system interface, 8052 control logic, 8 k bytes of instruction RAM, 256 bytes of RAM data memory and 32 bytes of bootstrap ROM. A special base register for indexed addressing of external memory, a 16-bit I/O address decode circuit and ten programmable I/O lines which are used to implement dedicated control functions are also included within I/O controller processor 110.

In addition to functioning as part of the diagnostic system, I/O controller processor 110 functions as a keyboard controller, a microwire controller, an Inter IC Communication ($I^2C$) controller, a universal asynchronous receiver transmitter (UART) controller, a serial infrared (SIR) controller and a fast keyboard controller reset state machine. Fast gate A20 and fast keyboard controller reset logic are included within I/O controller processor 110 to boost system performance and reduce the program memory size requirement to implement these functions.

I/O controller processor 110 also includes keyboard connection terminals to which a keyboard is coupled, mouse connection terminals to which a mouse is coupled, microwire connection terminals to which a microwire peripheral may be optionally coupled, $I^2C$ connection terminals to which an $I^2C$ peripheral may be optionally coupled, modem connection terminals to which a modem may be optionally coupled and infrared connection terminals to which an infrared transceiver may be optionally coupled. I/O controller processor 110 also includes system programmable interrupt controller (PIC) connection terminals to which a system PIC may be coupled, fuse terminal to which a keyboard fuse is coupled, password terminal to which a password indicator is coupled, and clock terminal to which an 8–20 MHz clock circuit is coupled.

Address decode and configuration register circuit 122 and signature analysis circuit 112 are both coupled to terminals which couple I/O controller 46 to I/O bus 44. Additionally, signature analysis circuit 112 is independently coupled to I/O controller processor 110.

Signature analysis logic 112 provides a signal capture function for diagnostic system 100. By being located within I/O controller 46 and coupled to I/O bus 44, signal analysis logic 112 has access to the vast majority of signals which are present in computer system 10. Signature analysis logic 112 includes a plurality of signal capture circuits 140. Signal capture circuits 140 function under control of I/O controller processor 110 to provide the signal capture function (i.e., an instantaneous signal storage function) at a predetermined time. The signals which are stored within the signal capture circuits 140 allow I/O controller processor 110 to provide computer system 10 with the diagnostic function by comparing the captured signature to a baseline, i.e., known good, signature.

Soft power logic 116 allows I/O controller 110 to support interfacing to a soft power supply, thus allowing control of system power supply turn on and turn off. An external momentary DC power switch (i.e., an on/off button) is supported for power on and off. Application or system software may also turn off the system power supply by accessing the soft power logic 116. Additionally, other sources such as an RTC alarm may also turn on or off the system power.

Reset logic 114 and soft power logic 116 allow interrupting system processor 12 during a system reset request or system power turn off request. This interrupt is connected to the system management interrupt (SMI) and allows a layer of host firmware intervention before permitting the request to be performed, thus allowing the system to gracefully shut down.

Real time clock 118 provides a time of day clock and 100 year calendar with alarm features and battery operation. Real time clock 118 includes three maskable interrupt sources and 241 bytes of general purpose RAM. The external battery source allows RTC 118 to maintain the RAM and a valid time. Real time clock 118 is software compatible with the real time clocks available under the trade designations DS1287 and MC146818.

Memory controller 126 provides an 8-bit interface to ROM 70 as well as providing flash memory update control. By providing access to ROM 70 through I/O controller 46, ROM 70 may be advantageously in-circuit programmed. Additionally, by providing flash memory control, ROM 70, and thus BIOS 92, may be remotely rewritten, thereby simplifying system troubleshooting and repair of BIOS related problems.

I/O controller processor 110 performs a microwire controller function which provides a microwire interface to microwire peripherals. Examples of microwire peripherals include A/D converts, memory, timers/counters, digital PLLs, telecom peripherals and display drivers. I/O controller processor 110 also performs an $I^2C$ controller function which provides an $I^2C$ interface for interfacing with $I^2C$ peripherals.

Figure 3:
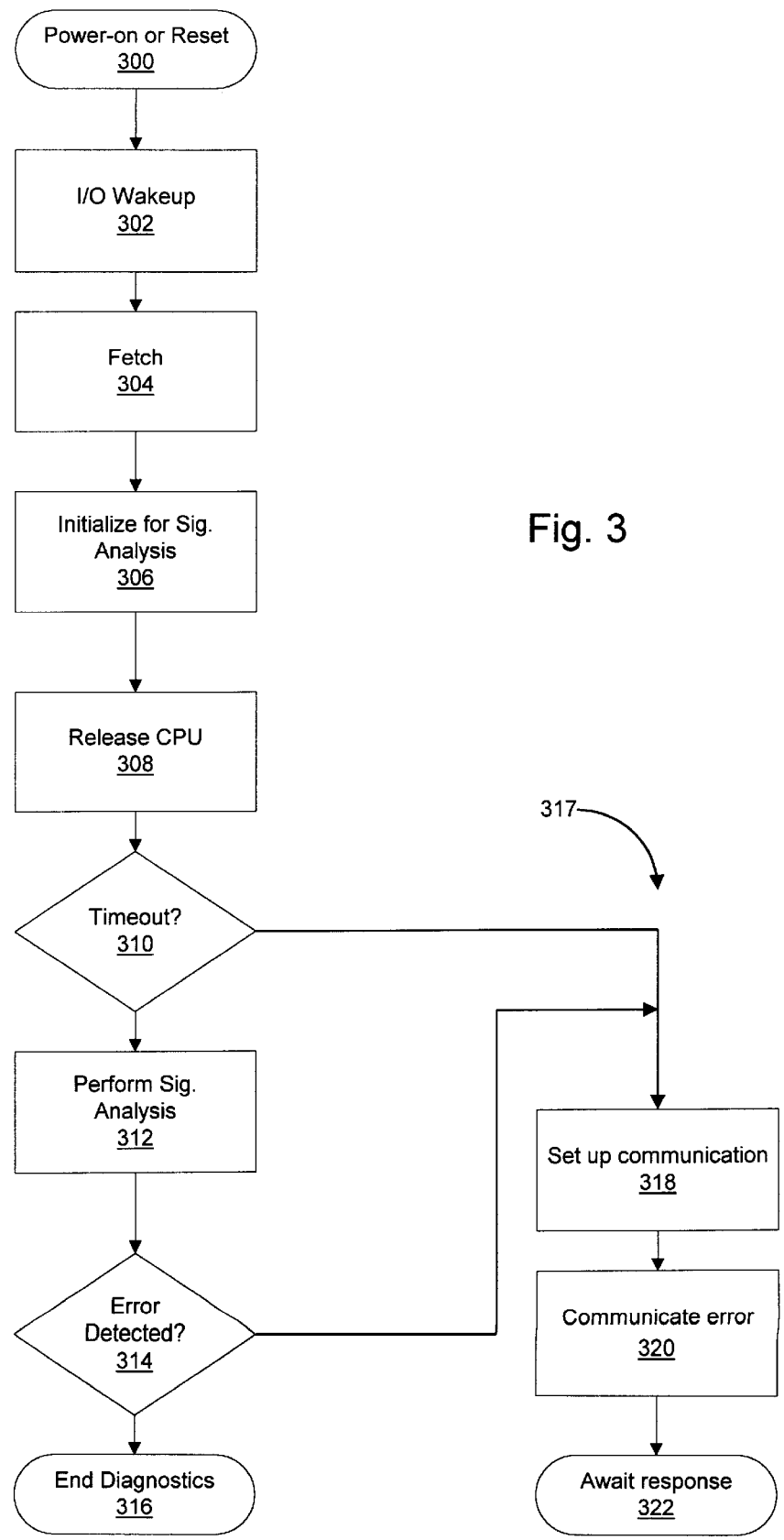
FIG. 3 is a flow chart of the operation of a diagnostic system at power on or reset of the computer system on which the diagnostic system resides in accordance with the present invention.

Referring to FIGS. 2 and 3, when computer system 10 is first powered on or reset as depicted by power on or reset step 300, control of computer system 10 passes to I/O controller 46 at I/O wakeup step 302. During I/O wakeup step 302, I/O controller 46 provides an active keyboard reset signal to processor 12 via, e.g., bus 44. An active keyboard reset signal holds processor 12 in a reset condition. Control then transitions to fetch step 304 during which I/O controller 46 fetches diagnostic program 90 from ROM 70 under the control of memory controller 126. This diagnostic program 90 is loaded into RAM 130 of I/O controller processor 110. Accordingly, this diagnostic program 90 does not require system memory 36 (see FIG. 1) to operate. As soon as diagnostic program 90 is loaded into RAM 130 of I/O controller processor 110, LED 79 is enabled and begins flashing under control of I/O controller processor 110 and RTC 118. If a flashing LED 79 is not present then a user or service technician can determine that a very basic operating failure is present within computer system 10.

After diagnostic program 90 is loaded into RAM 130 of I/O controller processor 110, the diagnostic program 90 initializes signature analysis logic 112 at initialize signature analysis step 306. After signature analysis logic 112 is initialized, control transitions to release processor step 308 during which I/O controller processor 110 inactivates the keyboard reset signal, thus releasing processor 12 from the reset condition and allowing processor 12 to initialize. After processor 12 is released, RTC 118 starts a dead man timer for, e.g., two minutes. Processor 12 must respond within the time set forth by the dead man time by providing signals to I/O controller processor 110 indicating that processor 12 is functioning.

If processor 12 does respond as determined by time-out step 310, then I/O controller processor 110 causes signature analysis logic 112 to capture the responding signals by capturing the states of the signals within signal capture circuits 140 of signature analysis logic 112. These captured signals are compared by I/O controller processor 110 to baseline signals (i.e., a set of known good signals) which are stored within diagnostic program 90 at perform signature analysis step 312. If an error is not detected by I/O controller processor 110 at error detection step 314, then control passes to end diagnostics step 316 and the power on diagnostics are complete. I/O controller processor 110 detects an error by determining whether the captured signals match the baseline signals; when the captured signals do not match the baseline signals, an error is present. At end diagnostics step 316, I/O controller processor 110 ceases causing LED 79 to flash and causes it to provide a constant light, thus indicating to a user that the diagnostics function has completed. After the power on diagnostics are complete, computer system 10 continues with its initialization process as is known in the art.

If processor 12 does not respond after its reset condition is released by I/O controller processor 110, as determined by time-out step 310, then I/O controller processor 110 determines that an error condition is present and control passes to error handling portion 317 of diagnostic program 90. Additionally, if I/O controller processor 110 detects an error during error detection step 314, then control also passes to error handling portion 317 of diagnostic program 90.

Error handling portion 317 of diagnostic program 90 allows computer system 10 to externally communicate the detection of an error. More specifically, I/O controller 46 initializes modem 80 with the modem program 93 which is stored within ROM 70 at set up communication step 318. After modem 80 is initialized, I/O controller 46 communicates the error, to e.g., a remote service location, at communicate error step 320. After I/O controller 46 communicates the error, the diagnostics are presently complete and computer system 10 awaits a response at await response step 322. The response may be in the form of further remote diagnostics or in the form of sending a service technician to service computer system 10. Because modem 80 is initialized and controlled via a program which is stored within ROM 70, the communications by modem 80 are at a basic level and do not require processor 12 or system memory 36 to operate.

Figure 4:
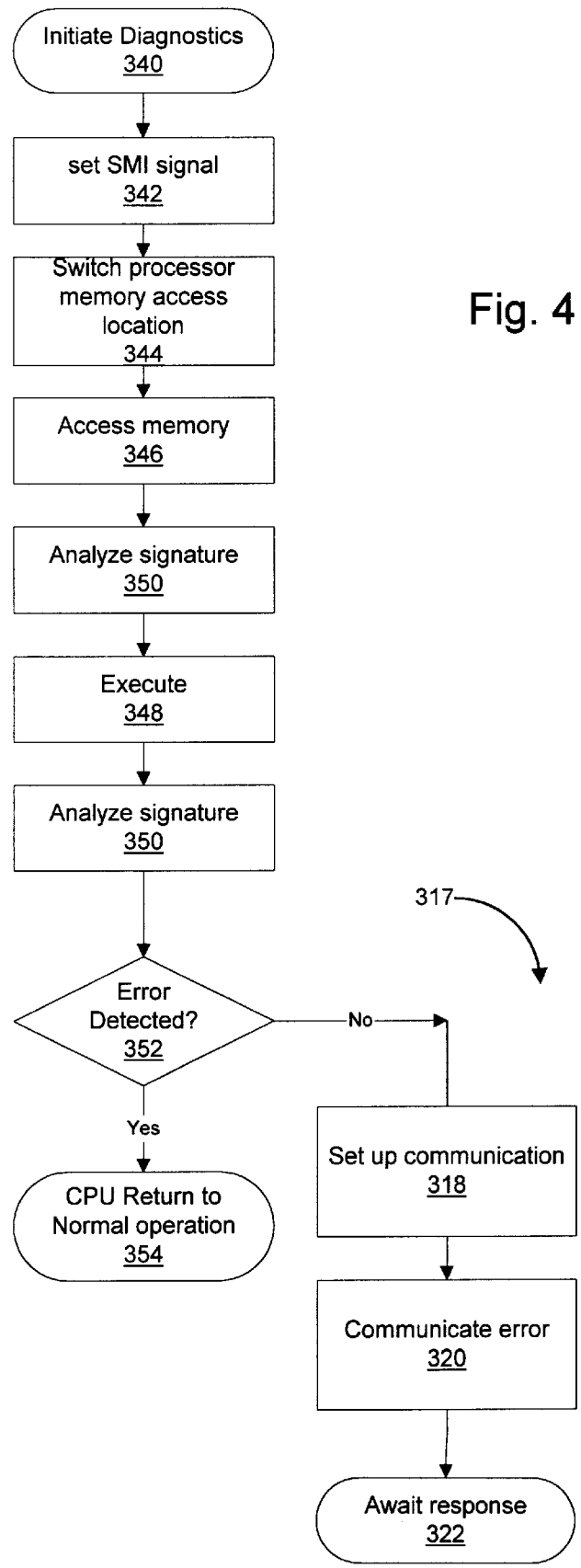
FIG. 4 is a flow chart of the operation of a diagnostic system while the computer system on which the diagnostic system resides is in operation in accordance with the present invention.

Referring to FIGS. 1, 2 and 4, an in system diagnostics function may be performed while computer system 10 is operating. More specifically, the diagnostics function may be remotely initiated or initiated by diagnostic system 100 at initiate diagnostics step 340. I/O controller 46 initiates the diagnostics function by generating an active SMI signal at set SMI signal step 342. The SMI signal causes processor 12 to switch to a different section of memory at memory switch step 344. Processor 12 then accesses a predetermined module of sample software at access step 346.

The sample software causes processor 12 to function in a predetermined manner, for example to cause processor 12 to execute a hard disk access. Diagnostic program 90 then initializes signature analysis logic 112 at initialize signature analysis step 347. Processor 12 then executes the sample software at execute step 348. While the sample software is executed, I/O controller processor 130 causes signature capture logic 112 to capture the signals which are generated by processor 12. These captured signals are analyzed by signature capture logic 112 and I/O controller processor 110 at analyze signature step 350 as described above. I/O controller processor 352 then determines whether an error is detected at error detected step 352.

If an error is not detected, as determined at error detection step 352, then control passes to end diagnostics step 354 and processor 12 returns to normal operation. I/O controller processor 130 determines whether an error is present by comparing the captured signals with the baseline signals and determining whether there is a difference between the captured signals and the baseline signals. If the captured signals and the baseline signals match then there is no error.

Because diagnostics system 100 uses the SMI signal to initiate the diagnostics function, the execution of the in system diagnostics function is transparent to any application programs which are running on processor 12.

If an error is detected, as determined by error detection step 352, then control also passes to error handling portion 317 of diagnostic code 90. As with the power on or reset diagnostics, with in process diagnostics, error handling portion 317 of diagnostic code 90 allows computer system 10 to externally communicate the detection of an error.

OTHER EMBODIMENTS

Other embodiments are within the following claims.

For example, it will be appreciated that other computer system configurations could be implemented while still embodying a diagnostic system in accordance with the present invention. Also for example, it will be appreciated that I/O controller 46 could include various combinations of the functions set forth above. Also for example, while the preferred embodiment uses a diagnostic program, it will be appreciated that circuitry such as application specific integrated circuitry could be used to provide the same functionality.

What is claimed is:

1. A computer system comprising:

a system processor;

system memory coupled to the system processor;

an input/output (I/O) controller coupled to the system processor, the I/O controller including an I/O controller processor and signature analysis logic coupled to the I/O controller processor, the I/O controller processor in conjunction with the signature analysis logic providing a diagnostic system executing independent of the system processor, wherein:

the signature analysis logic captures signals provided by the components including the system processor external to the I/O controller, the signature analysis logic providing the captured signals to the I/O controller processor for analysis; and a nonvolatile memory coupled to the I/O controller, the nonvolatile memory including a diagnostic program, the diagnostic system executing the diagnostic program to test the computer system, including the system processor.

2. The computer system of claim 1 wherein the I/O controller includes:

an I/O controller memory, the I/O controller memory receiving and storing the diagnostic program; and an I/O controller processor coupled to the I/O controller memory, the I/O controller processor executing the diagnostic program to test components including the system processor external to the I/O controller.

3. The computer system of claim 2 wherein the I/O controller processor includes the I/O controller memory.

4. The computer system of claim 2 wherein the I/O controller includes:

signature analysis logic coupled to both the I/O controller processor and the system processor, the signature analysis logic capturing signals provided by the components including the system processor external to the I/O controller apparatus, the signature analysis logic providing the captured signals to the I/O controller processor for analysis.

5. The computer system of claim 1 wherein the signature analysis logic is coupled to the I/O controller processor and to the system processor.

6. An input/output (I/O) controller apparatus coupled to receive a diagnostic program from a nonvolatile memory, the I/O controller apparatus comprising:

an I/O controller memory, the I/O controller memory receiving and storing the diagnostic program;

an I/O controller processor coupled to the I/O controller memory, the I/O controller processor executing the diagnostic program to test components including the system processor external to the I/O controller apparatus; and a signature analysis logic coupled to the I/O controller processor, the I/O controller processor in conjunction with the signature analysis logic providing a diagnostic system, wherein:

the signature analysis logic captures signals provided by the components including the system processor external to the I/O controller, the signature analysis logic providing the captured signals to the I/O controller processor for analysis.

7. The I/O controller apparatus of claim 6 wherein:

the I/O controller processor includes the I/O controller memory.

8. A method of performing diagnostics on a computer system having a processor and an I/O controller processor comprising:

providing an input/output (I/O) controller, the (I/O) controller including a diagnostic system, the diagnostic system including baseline signal states;

capturing signals provided by the processor with the diagnostic system to provide a set of states representing the captured signals;

in the I/O controller processor, comparing the set of states representing the captured signals with the baseline signal states to generate comparison results; and determining whether the processor is functioning properly based upon the comparison results.

9. A computer system comprising:

a system processor;

system memory coupled to the system processor;

a diagnostic system executable independent of the system processor, wherein the diagnostic system is embedded in a controller apparatus, the controller apparatus including:

a controller memory, the controller memory receiving and storing a diagnostic program;

a controller processor coupled to the controller memory, the controller processor executing the diagnostic program to test components including the system processor that are external to the controller; and signature analysis logic coupled to the system processor and coupled to the controller processor, the signature analysis logic capturing signals provided by the components including the system processor external to the apparatus, the signature analysis logic providing the captured signals to the controller processor for analysis; and a nonvolatile memory distinct from the system memory, the nonvolatile memory including the diagnostic program, the diagnostic system running the diagnostic program independent from the system memory to test the system processor.

10. The computer system of claim 9 wherein the controller processor includes the controller memory.

11. An apparatus that includes a diagnostic system executable independent of a system processor, the apparatus coupled to receive a diagnostic program from a nonvolatile memory, the apparatus comprising:

a memory receiving and storing the diagnostic program;

an apparatus processor coupled to the apparatus, the apparatus processor executing the diagnostic program to test system components; and signature analysis logic coupled to the system processor and to the apparatus processor, the signature analysis logic capturing signals provided by the components including the system processor external to the apparatus, the signature analysis logic providing the captured signals to the apparatus processor for analysis.

12. The apparatus of claim 11 wherein:

the apparatus processor includes the memory.

13. The apparatus of claim 12 wherein the memory includes bootstrap read only memory (ROM).

14. A method of performing diagnostics on a computer system having a system processor and a second processor comprising:

providing a diagnostic system executable via the second processor independent of the system processor, the diagnostic system including baseline signal states;

capturing signals provided by the system processor with the diagnostic system to provide a set of states representing the captured signals;

using the second processor to compare the set of states representing the captured signals with the baseline signal states to generate comparison results; and determining whether the system processor is functioning properly based upon the comparison results.

15. The method of claim 14 further comprising:

permitting the system processor to initialize if the comparison results show that the system processor is functioning properly.

* * * * *